US011327533B2

(12) United States Patent
Wang et al.

(10) Patent No.: US 11,327,533 B2
(45) Date of Patent: May 10, 2022

(54) FLEXIBLE DISPLAY SCREEN AND ELECTRONIC DEVICE HAVING DEFORMATION HOLES IN FOLDING REGION

(71) Applicant: BOE TECHNOLOGY GROUP CO., LTD., Beijing (CN)

(72) Inventors: Haoran Wang, Beijing (CN); Fangxu Cao, Beijing (CN); Liming Dong, Beijing (CN); Yonghong Zhou, Beijing (CN); Xueyang Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 107 days.

(21) Appl. No.: 16/836,019

(22) Filed: Mar. 31, 2020

(65) Prior Publication Data

US 2021/0141419 A1 May 13, 2021

(30) Foreign Application Priority Data

Nov. 13, 2019 (CN) ......................... 201911104535.2

(51) Int. Cl.
*G06F 1/16* (2006.01)
*G09F 9/30* (2006.01)
*G09G 3/00* (2006.01)

(52) U.S. Cl.
CPC ............ *G06F 1/1652* (2013.01); *G09F 9/301* (2013.01); *G09G 3/035* (2020.08)

(58) Field of Classification Search
CPC .... G06F 1/1641; G06F 1/1652; G06F 1/1681; G06F 1/203; G06F 1/1626; G09F 9/301;
(Continued)

(56) References Cited

U.S. PATENT DOCUMENTS

2015/0043174 A1* 2/2015 Han ...................... G06F 1/1626 361/749
2016/0027718 A1* 1/2016 Park ...................... H01L 51/529 165/80.3

(Continued)

FOREIGN PATENT DOCUMENTS

CN 106486010 A 3/2017
CN 108399021 A 8/2018

(Continued)

OTHER PUBLICATIONS

Office Action of CN Application No. 201911104535.2 and English translation, dated Mar. 30, 2021, 14 pages.

*Primary Examiner* — Richard J Hong
(74) *Attorney, Agent, or Firm* — Muncy, Geissler, Olds & Lowe, P.C.

(57) ABSTRACT

The preset disclosure relates to a flexible display screen and an electronic device. The flexible display screen includes: a display screen body having a flat position and a bendable position; and a support plate disposed on a non-display surface of the display screen body; wherein the support plate comprises a flat plate and a bending portion; the flat plate is located at the flat position, and configured to support the display screen body; the bending portion is located at the bendable position and bent to fit the bendable position of the display screen body, and includes a plurality of deformation holes spaced from each other.

18 Claims, 6 Drawing Sheets

(58) Field of Classification Search
CPC ............. H01L 51/5243; H01L 51/5237; H01L 51/529; H05K 5/03; H05K 5/0217; H05K 7/20481; B32B 3/18; G09G 3/035
See application file for complete search history.

(56) References Cited

U.S. PATENT DOCUMENTS

| | | | | |
|---|---|---|---|---|
| 2016/0299532 | A1 | 10/2016 | Gheorghiu et al. | |
| 2016/0357052 | A1* | 12/2016 | Kim | H01L 51/5237 |
| 2016/0377281 | A1* | 12/2016 | Xu | F21V 31/00<br>362/249.02 |
| 2017/0060188 | A1 | 3/2017 | Han et al. | |
| 2018/0190936 | A1* | 7/2018 | Lee | B32B 3/18 |
| 2019/0132987 | A1* | 5/2019 | Koo | H05K 5/0217 |
| 2019/0207141 | A1* | 7/2019 | Kim | H01L 51/5243 |
| 2019/0259310 | A1* | 8/2019 | Ha | G09F 9/301 |
| 2019/0355927 | A1* | 11/2019 | Park | H05K 5/03 |
| 2020/0245501 | A1* | 7/2020 | Wu | H05K 7/20481 |
| 2020/0273379 | A1 | 8/2020 | Wang et al. | |

FOREIGN PATENT DOCUMENTS

| | | | |
|---|---|---|---|
| CN | 108582939 | A | 9/2018 |
| CN | 108594504 | A | 9/2018 |
| CN | 208141720 | U | 11/2018 |
| CN | 109036133 | A | 12/2018 |
| CN | 109859642 | A | 6/2019 |
| CN | 110010001 | A | 7/2019 |
| KR | 20190081335 | A | 7/2019 |

* cited by examiner

FLEXIBLE DISPLAY SCREEN AND ELECTRONIC DEVICE HAVING DEFORMATION HOLES IN FOLDING REGION

CROSS-REFERENCE TO RELATED APPLICATION

The present application claims a priority to Chinese Patent Application No. 201911104535.2 filed in China on Nov. 13, 2019, the disclosure of which is incorporated herein in its entirety by reference.

TECHNICAL FIELD

The present disclosure relates to the field of electronic device technology, and in particular to a flexible display screen and an electronic device.

BACKGROUND

With the development of display technology, flexible display devices gradually come into the sight of consumers. In the related solutions, When the flexible display device is deployed, because the display panel is thin and has a strong bending inertia, the overall flatness of the display panel is poor, which affects the appearance of the product and the user's experience.

SUMMARY

The embodiment of the present disclosure provides a flexible display screen, comprising:

a display screen body having a flat position and a bendable position; and a support plate disposed on a non-display surface of the display screen body;

wherein the support plate comprises a flat plate and a bending portion;

the flat plate is located at the flat position, and configured to support the display screen body;

the bending portion is located at the bendable position and bent to fit the bendable position of the display screen body, and comprises a plurality of deformation holes spaced from each other.

According to some embodiments of the present disclosure, the support plate further comprises:

a support metal layer disposed on the non-display surface of the display screen body; and a heat dissipation metal layer disposed on a surface of the support metal layer away from the display screen body, wherein the materials of the heat dissipation metal layer and the support metal layer are different.

According to some embodiments of the present disclosure, a heat conductivity coefficient of the heat dissipation metal layer is higher than a heat conductivity coefficient of the support metal layer, a strength of the support metal layer is not less than a strength of the heat dissipation metal layer, a hardness of the support metal layer is not less than a hardness of the heat dissipation metal layer.

According to some embodiments of the present disclosure, each of the deformation holes is located on the heat dissipation metal layer, and is filled with a polymer heat conducting component.

According to some embodiments of the present disclosure, the support metal layer and the heat dissipation metal layer are integrated parts.

According to some embodiments of the present disclosure, the support metal layer and the heat dissipation metal layer are integrated through a rolling process or a coating process.

According to some embodiments of the present disclosure, a thickness of the support metal layer ranges from 0.015 to 0.5 mm; and/or a thickness of the heat dissipation metal layer ranges from 0.04 to 0.5 mm.

According to some embodiments of the present disclosure, a heat-insulating layer is provided between the support plate and the display screen body.

According to some embodiments of the present disclosure, the heat-insulating layer is made of rubber or silicone.

According to some embodiments of the present disclosure, each of the deformation holes penetrates the support plate along a thickness direction of the support plate;

the flexible display screen further comprises a heat insulation filling layer connected to the heat-insulating layer, and each of the deformation holes is provided with the heat insulation filling layer.

According to some embodiments of the present disclosure, the flat plate further comprises:

a first plane segment and a second plane segment, and the first plane segment and the second plane segment are respectively connected to two ends of the bending portion, and the material of the bending portion is different from the material of the first plane segment and the material of the second plane segment.

According to some embodiments of the present disclosure, a strength of the bending portion is not less than a strength of the first plane segment;

a hardness of the bending portion is not less than a hardness of the first plane segment;

a strength of the bending portion is not less than a strength of the second plane segment; and a hardness of the bending portion is not less than a hardness of the second plane segment.

According to some embodiments of the present disclosure, each of the bending portion, the first plane segment, and the second plane segment has a single-layer structure.

According to some embodiments of the present disclosure, a material of the first plane segment is the same as a material of the second plane segment, and the first plane segment and the second plane segment form a plane segment;

the plane segment is connected to the bending portion through a transition segment, the transition segment comprises a first material layer and a second material layer laminated along the thickness direction of the support plate, a material of the first material layer is the same as a material of the plane segment, and the first material layer is respectively connected to the plane segment and the bending portion; a material of the second material layer is the same as a material of the bending portion, and the second material layer is respectively connected to the plane segment and the bending portion.

According to some embodiments of the present disclosure, a thickness of the first material layer is uniform, a thickness of the second material layer is uniform, and a thickness of the transition segment, a thickness of the plane segment, and a thickness of the bending portion are equal.

According to some embodiments of the present disclosure, a thickness of the transition segment, a thickness of the plane segment, and a thickness of the bending portion are equal;

in a direction from the plane segment to the bending portion, a thickness of the first material layer decreases gradually and a thickness of the second material layer increases gradually.

According to some embodiments of the present disclosure, the flat plate further comprises:

a first plane segment and a second plane segment, and the first plane segment and the second plane segment are respectively connected to two ends of the bending portion, the bending portion comprises a plurality of first connection segments and a plurality of second connection segments, the plurality of first connection segments are connected between the first plane segment and the second plane segment, and the plurality of second connection segments are connected between the first plane segment and the second plane segment, in a direction perpendicular to a direction from the first plane segment to the second plane segment, the plurality of first connection segments and the plurality of second connection segments are alternately disposed and connected to each other;

wherein the first plane segment, the second plane segment and the first connection segment are integrally formed with the same material, and a material of the second connection segment is different from a material of the first plane segment.

According to some embodiments of the present disclosure, the first plane segment and the second plane segment form a plane segment;

two ends of the second connection segment are connected to the plane segment by a transition segment, the transition segment comprises a first material layer and a second material layer laminated along the thickness direction of the support plate, a material of the first material layer is the same as a material of the plane segment, and the first material layer is connected to the plane segment and the second connection segment respectively; a material of the second material layer is the same as a material of the second connection segment, and the second material layer is connected to the plane segment and the second connection segment respectively.

According to some embodiments of the present disclosure, a width of the first connection segment is different from a width of the second connection segment.

According to some embodiments of the present disclosure, the display screen body is bent at the bendable position;

the flat plate further comprises a first plane segment and a second plane segment, and the first plane segment and the second plane segment are respectively connected to two ends of the bending portion, in a direction from the first plane segment to the second plane segment, a length of the bending portion is equal to a length of the display screen body, and the first plane segment and the second plane segment are respectively disposed on two sides of the display screen body.

According to some embodiments of the present disclosure, the display screen body comprises a first straight segment, a first bent segment, and a second straight segment that are sequentially connected, the first straight segment and the second straight segment are laminated at the bendable position, and the first bent segment is bent;

the flat plate further comprises a first plane segment and a second plane segment which are connected to two ends of the bending portion respectively, wherein the first plane segment is directly opposed to the first straight segment, the bending portion is directly opposed to the first bent segment, and the second plane segment is directly opposed to the second straight segment.

According to some embodiments of the present disclosure, the first plane segment is provided with a first mounting hole extending in a thickness direction of the first plane segment, and a heat conducting metal component is provided in the first mounting hole for blocking the first mounting hole.

According to some embodiments of the present disclosure, the second plane segment is provided with a second mounting hole extending in a thickness direction of the second plane segment, and a ground metal component is provided in the second mounting hole for blocking the second mounting hole, the ground metal component is configured as a ground point.

The embodiment of the present disclosure also provides an electronic device including the above flexible display screen.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative efforts.

Figure 1:
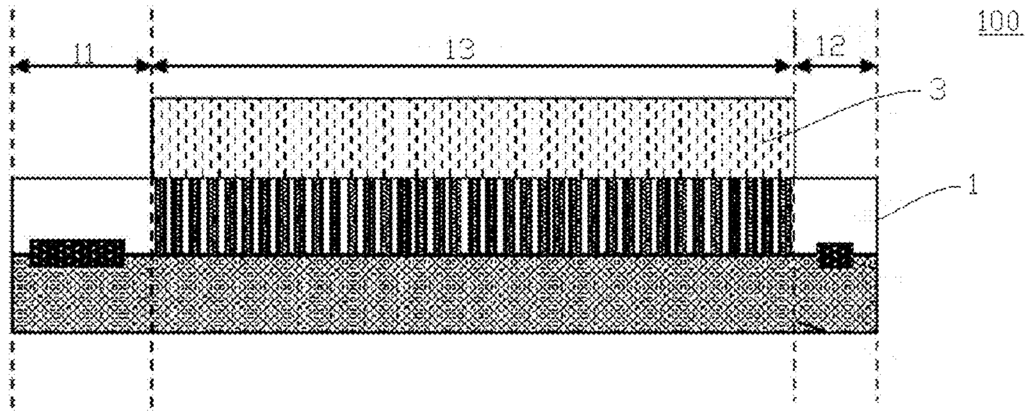
FIG. 1 is a schematic cross-sectional view of a flexible display screen according to some embodiments of the present disclosure.

REFERENCE NUMERALS flexible display screen 100;
support plate 1; first plane segment 11; first mounting hole 111;
heat conducting metal component 1111; second plane segment 12;
second mounting hole 121; ground metal component 1211;
bending portion 13; deformation hole 131; heat conducting component 1311;
first connection segment 132; second connection segment 133;
transition segment 14; first material layer 141; first material layer 142;
support metal layer 15; heat dissipation metal layer 16;
heat-insulating layer 21; heat insulation filling layer 22;
display screen body 3; first straight segment 31; second straight segment 32;
first bent segment 33; cover plate 34; polarizer 35; touch layer 36; backlight layer 37.

DETAILED DESCRIPTION

To describe the objective, the technical solutions and the advantages of embodiments of the present disclosure more clearly, the technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person of ordinary skill in the art based on the described embodiments of the present disclosure fall within the scope of the present disclosure.

A flexible display screen 100 according to an embodiment of the present disclosure is described below with reference to the drawings.

As shown in FIGS. 1, 2, 3, 15 and 16, a flexible display screen 100 according to an embodiment of the present disclosure comprises a display screen body 3 and a support plate 1.

Figure 16:
FIG. 16 is a schematic diagram of the flexible display screen shown in FIG. 15 in another direction.

Specifically, referring to FIG. 16, the display screen body 3 may comprise a cover 34, a polarizer 35, a touch layer 36, a backlight layer 37 and the like, which are sequentially laminated. The specific structure of the display screen body 3 and the operation principles of each layer are well known to the skilled person in the art, and will not be described in detail here.

The display screen body 3 has a flat position and a bendable position. At the flat position, the display screen body 3 may be substantially in a flat shape or in a flat shape to facilitate the work of the flexible display screen 3; at the bendable position, the display screen body 3 may be a folding screen, that is, the display screen body 3 is in a folded state, or the display screen body 3 is a curved screen, that is, the display screen 3 is in a curved state.

The support plate 1 is disposed on a non-display surface of the display screen body 3, and the support plate 1 can support the display screen body 3. Specifically, the support plate 1 includes a flat plate and a bending portion 13. At the flat position, the support plate 1 is a flat plate to support the display screen body 3. At a bendable position, the bending portion 13 is bent to fit the bendable position of the display screen body 3. That is, at a flat position, the bending portion 13 is stretched into a flat shape so that the support plate 1 is a flat plate to support the display screen body 3 and prevent the display screen body 3 from being bent. At the bendable position, the bending portion 13 can be bent into a shape corresponding to the bendable position of the display screen body 3 to facilitate the bending of the flexible display screen 100.

Figure 4:
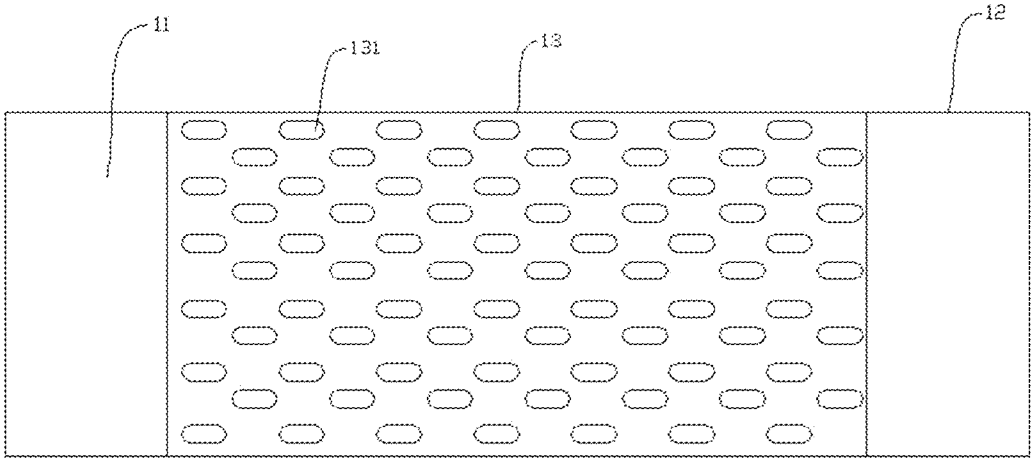
FIG. 4 is a schematic diagram of a support plate according to some embodiments of the present disclosure.

As shown in FIG. 4, the bending portion 13 has a plurality of deformation holes 131 spaced from each other. Therefore, by providing a plurality of deformation holes 131, when the bending portion 13 is bent, it can help release certain bending stress, the bending ability of the bending portion 13 is improve, and the deformation requirements of the bending portion 13 is met when the bending portion is bent.

According to the flexible display screen 100 of the embodiment of the present disclosure, the support plate 1 comprises a bending portion 13 by arranging the support plate 1 on a non-display surface of the display body 3. At a flat position, the support plate 1 is a flat plate to support the display screen body 3. At the bendable position, the bending portion 13 is bent to fit the bendable position of the display screen body 3. In this way, the support plate 1 can be configured to support the display screen body 3 to prevent the display screen body 3 from being unfolded into a flat shape when in a flat position. It is beneficial to improve the flatness of the entire flexible display screen 100. In addition, by providing a plurality of deformation holes 131, the bending ability of the bending portion 13 is improved, and the deformation requirements of the bending portion 13 when being bent are met.

According to some embodiments of the present disclosure, the support plate 1 comprises at least a support metal layer 15 and a heat dissipation metal layer 16. The support metal layer 15 is provided on a non-display surface of the display screen body 3, and the heat dissipation metal layer 16 is provided on a surface of the support metal layer 15 away from the display screen body 3.

That is, the support plate 1 comprises two or more layers (for example, three or more layers), of which two layers are a support metal layer 15 and a heat dissipation metal layer 16 which are arranged in a stack. The support metal layer 15 is provided on the non-display surface of the display screen body 3, which is mainly configured to support the display screen body 3, enhance the recovery ability of the display screen body 3 from a bendable position to a flat position, and improve the flatness of the flexible display screen 100. The heat dissipation metal layer 16 is provided on a surface of the support metal layer away from the display screen body 3 (i.e., the inner surface), for the flexible display screen 100, the back of the flexible display screen 100 is generally provided with a circuit board and a battery, and the circuit board is provided with a heating device such as a chip. The arrangement of the heat dissipation metal layer 16 can facilitate the uniform dispersion of the heat inside the heating device, the battery and the device, avoiding local high heat concentration to cause damage to the display body 3, and the arrangement of the heat dissipation metal layer 16 can also improve the overall strength and crush resistance of the support plate 1.

Specifically, the material of the support metal layer 15 is different from that of the heat dissipation metal layer 16. Therefore, by making the material of the support metal layer 15 and the material of the heat dissipation metal layer 16 different, it is convenient to select different materials according to actual needs. The support metal layer 15 and the heat dissipation metal layer 16 are fabricated separately.

Specifically, a metal with high hardness and strength is selected to process the support metal layer 15 to ensure the reliable support of the display screen body 3 by the support metal layer 15, and improve the flatness of the flexible display 100. At the same time, a metal with a high heat conductivity coefficient is selected to improve the heat dissipation capability of the heat dissipation metal layer 16. That is, the strength and hardness of the support metal layer 15 are greater than the strength and hardness of the heat dissipation metal layer 16, and the heat conductivity coefficient of the heat dissipation metal layer 16 is higher than that of the support metal layer 15.

Optionally, the support metal layer 15 is made of a metal with high hardness and strength, such as nickel, high hardness stainless steel, etc., with a thickness of 0.015 to 0.5 mm, and the heat dissipation metal layer 16 should be a metal with high heat conductivity coefficient, such as copper or aluminum, with a thickness of 0.04-0.5 mm.

Specifically, on a plane perpendicular to the thickness direction of the support plate 1, the outer contour of a projection of the support metal layer 15, the outer contour of a projection of the heat dissipation metal layer 16, and the outer contour of a projection of the heat-insulating layer 21 described below overlap. Therefore, the structure is simple, and it is convenient for processing and manufacturing.

Figure 5:
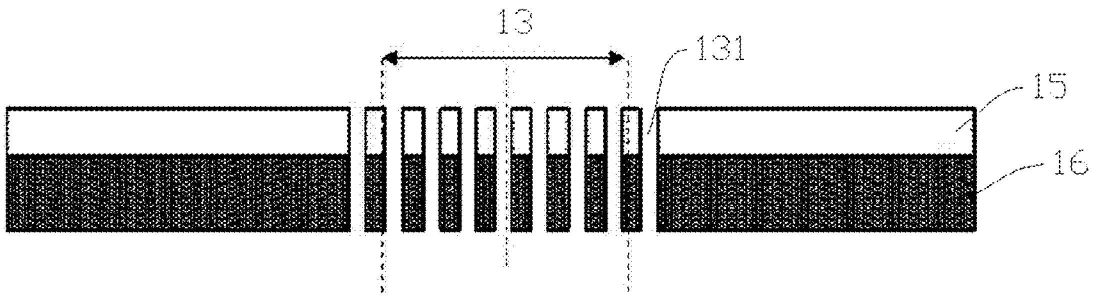
FIG. 5 is a schematic cross-sectional view of a support plate according to some embodiments of the present disclosure.
Figure 6:
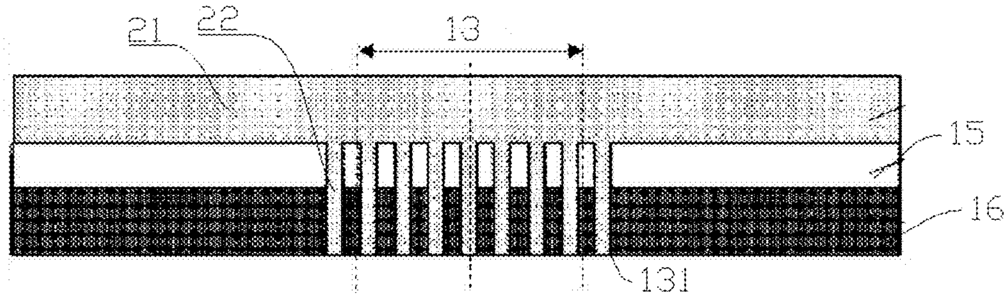
FIG. 6 is a schematic cross-sectional view of a support plate mating with a heat-insulating component according to some embodiments of the present disclosure.
Figure 7:
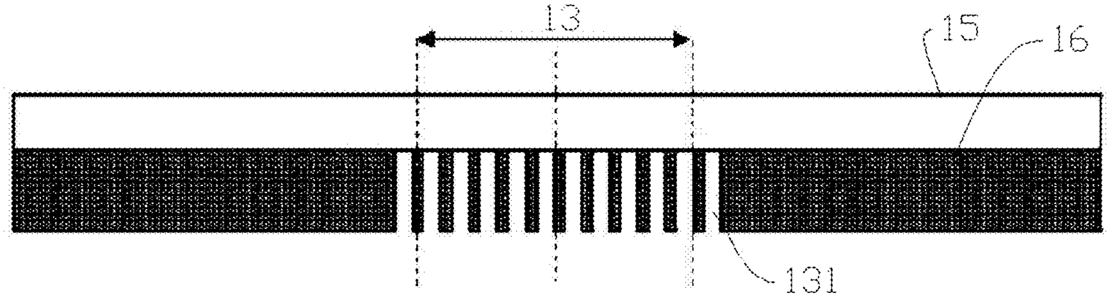
FIG. 7 is a schematic diagram of a support plate according to some embodiments of the present disclosure.
Figure 8:
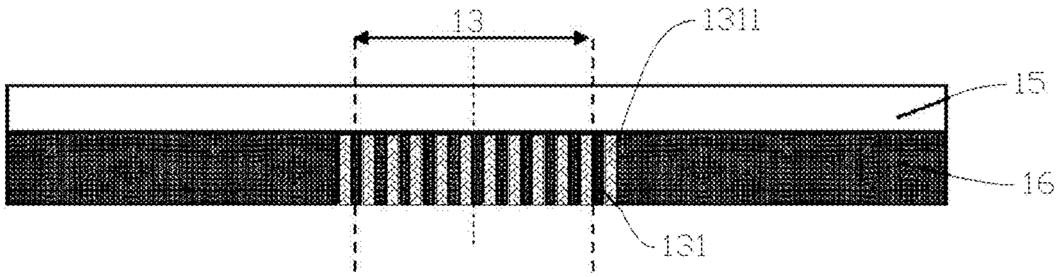
FIG. 8 is a schematic cross-sectional view of a connection between a support plate and a heat conducting component according to another embodiment of the present disclosure.
Figure 9:
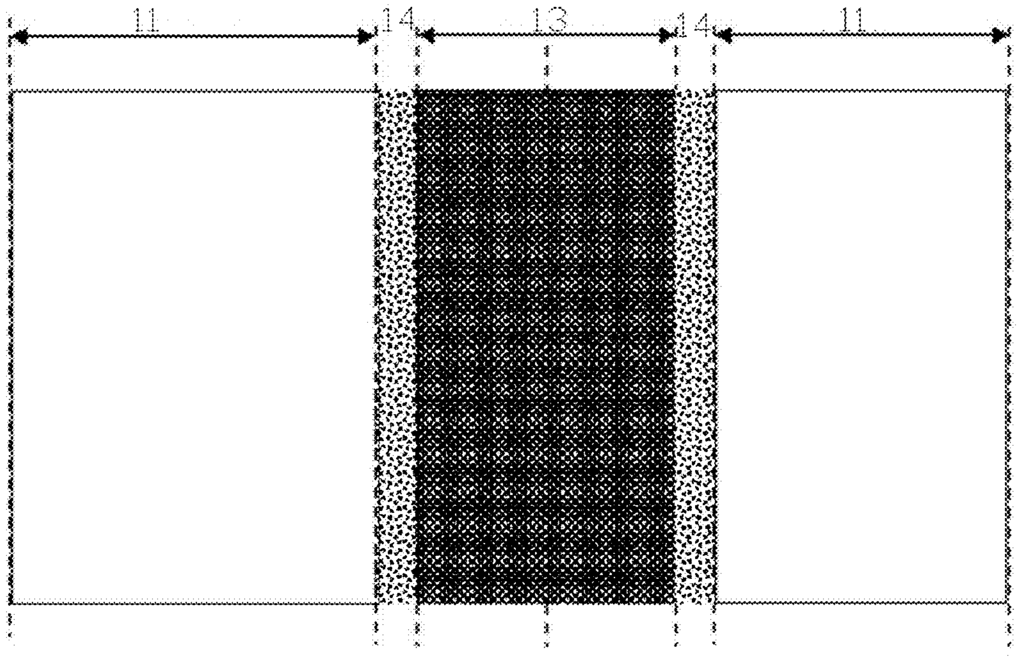
FIG. 9 is a schematic diagram of a support plate according to still another embodiment of the present disclosure.

In some embodiments of the present disclosure, a part of each deformation hole 131 is provided on the heat dissipation metal layer 16. That is, the bending portion 13 of the support plate 1 has two layers, as shown in FIGS. 5 to 6. The deformation hole 131 may be a through hole penetrating through the support plate 1 in the thickness direction of the support plate 1. Referring to FIGS. 7 to 8, the deformation hole 131 may also be a blind hole, and the deformation hole 131 only penetrates the heat dissipation metal layer 16 and is not formed on support metal layer 15. Therefore, it is advantageous to set the position of the deformation hole 131 according to actual needs.

Optionally, each deformation hole 131 is provided on the heat dissipation metal layer 16 and penetrates through the heat dissipation metal layer 16, and a polymer heat conducting component 1311 is provided in the deformation hole 131. For example, referring to FIG. 8, the deformation hole 131 is a blind hole. The deformation hole 131 penetrates the heat dissipation metal layer 16 only in the thickness direction and is not formed on the support metal layer 15. A polymer heat conducting component 1311 is provided in the deformation hole 131. In this way, the polymer heat conducting component 1311 and the heat dissipation metal layer 16 in the deformation hole 131 can act simultaneously, thereby evenly dispersing the heat in the heating device, the battery and the equipment, and avoiding damage to the display screen body 3 caused by local high heat concentration. At the same time, since the polymer heat conducting component 1311 is a flexible component, the arrangement of the polymer heat conducting component 1311 does not affect the bending ability of the bending portion 13.

Optionally, the support metal layer 15 and the heat dissipation metal layer 16 are integrated, and there is no adhesive layer between the support metal layer 15 and the heat dissipation metal layer 16. Specifically, the support metal layer 15 and the heat dissipation metal layer 16 are integrated into one body by means of metal bonds or lattice mutual compatibility. For example, the support metal layer 15 and the heat dissipation metal layer 16 are connected into one body through a rolling process or connected into one body through a coating process. Therefore, the connection strength between the support metal layer 15 and the heat dissipation metal layer 16 can be improved, and the problem of delamination can be avoided.

In some embodiments of the present disclosure, a heat-insulating layer 21 is provided between the support plate 1 and the display screen body 3, and the heat-insulating layer 21 can provide good heat insulation, prevent the heat of the support plate from being transmitted to the display screen body 3, and further improve the protection of the display screen body 3, and increase the service life of the display screen body 3.

For example, a heat-insulating layer 21 is provided between the above-mentioned support metal layer 15 and the display screen body 3, and the heat-insulating layer 21 can provide good heat insulation to prevent the heat of the heat dissipation metal layer 16 from being transferred to the support metal layer 15 and then being transferred from the support metal layer 15 to the display screen body 3, thereby helping to further improve the protection of the display screen body 3 and increase the service life of the display screen body 3.

Optionally, the heat-insulating layer 21 may be a polymer heat-insulating layer, and is made of material with low heat conductivity coefficient. For example, the heat conductivity coefficient of the heat-insulating layer 21 is lower than that of the support metal layer 15 and the heat dissipation metal layer 16. The heat-insulating layer 21 may be made of rubber, silicone, epoxy resin. Polymer heat-insulating layers such as rubber parts, silicone parts, or epoxy resins have a certain elastic deformation ability. They are flexible materials, which can buffer the stress of the display screen body 3 during the bending process, and can cushion the large rebound force of the support plate 1.

Optionally, the deformation hole 131 penetrates the support plate 1 in the thickness direction of the support plate 1, that is, the deformation hole 131 penetrates the support metal layer 15 and the heat dissipation metal layer 16 in the thickness direction of the support plate 1. Therefore, it is beneficial to save materials and reduce costs.

Optionally, as shown in FIG. 6, the flexible display screen 100 further comprises a heat insulation filling layer 22 connected to the heat-insulating layer 21, and the heat-insulating layer 21 is provided between the support metal layer 15 and the display screen body 3. Each of the deformation holes 131 is provided with the heat insulation filling layer 22. For example, as shown in FIG. 6, the heat-insulating layer 21 is located between the support metal layer 15 and the display screen body 3, and the heat insulation filling layer 22 is filled in the entire deformation hole 131. Therefore, it is beneficial to improve the connection strength between the support plate 1 and the heat-insulating layer 21, and the heat-insulating layer 21 can provide good heat insulation, preventing the heat of the heat dissipation metal layer 16 from being transferred to the support metal layer 15 and then being transferred from the support metal layer 15 to the display screen body 3, thereby helping to further improve the protection of the display screen body 3 and increase the service life of the display screen body 3.

Optionally, the heat-insulating filling layer 22 may be a polymer heat-insulating component and made of a material with a low heat conductivity coefficient. For example, the heat insulation filling layer 22 may be a rubber part, a silicone part, or an epoxy resin. Optionally, the material of the heat insulation filling layer 22 is the same as the material of the heat-insulating layer 21.

In some embodiments of the present disclosure, the flat plate comprises: a first plane segment 11, a bending portion 13, and a second plane segment 12 connected in sequence, that is, the first plane segment 11 and the second plane segment 12 are respectively connected to two ends of the bending portion 13, the material of the bending portion 13 is different from the material of the first plane segment 11 and the material of the second plane segment 12. That is, the material of the bending portion 13 is different from the material of the first plane segment 11, the material of the bending portion 13 is different from the material of the second plane segment 11, the material of the first plane segment 11 and the material of the second plane segment 12 may be the same or different. Therefore, by setting the material of the bending portion 13 to be different from that of the first and second plane segment, it is possible to select materials with different strength and hardness to fabricate the plane segment and the bending portion 13. Specifically, since the bending portion 13 needs to be bent frequently, the service life of the bending portion 13 can be improved by fabricating the bending portion 13 with a material with relatively high strength and hardness.

For example, the display screen body 3 comprises a first straight segment 31, a first bent segment 33, and a second straight segment 32 that are sequentially connected, at the bendable position, the display screen body 3 is foldable; the first straight segment 31 and the second straight segment 32 are laminated, and the first bent segment 33 is bent; the first plane segment 11 is directly opposed to the first straight segment 31, the bending portion 13 is directly opposed to the first bent segment 33, and the second plane segment 12 is directly opposed to the second straight segment 32.

Therefore, the flexible display screen 100 is a folding screen, and the bending portion 13 can be configured to support the first bent segment 33, disperse stress concentration and rebound. The first plane segment 11 is configured to support the first straight segment 31 and the second flat section 12 is configured to support the second straight segment 32 to improve the crush resistance of the flat area. In addition, since the bending portion 13 needs to be constantly bent, the bending portion 13 can be fabricated by using a material with relatively high strength and hardness, thereby improving the service life of the bending portion 13. The first plane segment 11 and the second plane segment 12 are fabricated by using a material with weak strength and hardness to ensure reliable support of the first plane segment 11 to the first straight segment 31 and the second plane segment 12 to the second straight segment 32.

Optionally, each of the first plane segment 11, the bending portion 13 and the second plane segment 12 has a single-layer structure. That is to say, the first plane segment 11 is only fabricated by one material to form a single layer, instead of a multilayer structure with different materials for different layers. The second plane segment 12 is only fabricated by one material to form a single layer, instead of a multilayer structure with different materials for different layers. The bending portion 13 is only fabricated by one material to form a single layer, instead of a multilayer structure with different materials for different layers.

Thus, the structure is simple, easy to process and manufacture, and the support plate 1 is relatively thin, which is conducive to ensure the bending ability of the support plate 1, while avoiding the occurrence of the stratification problem.

According to some embodiments of the present disclosure, a material of the first plane segment 11 is the same as a material of the second plane segment 12, and the first plane segment 11 and the second plane segment 12 form a plane segment. Referring to FIGS. 9 to 13, the plane segment is connected to the bending portion 14 through a transition segment 14, the transition segment 14 comprises a first material layer 141 and a second material layer 142 laminated along the thickness direction of the support plate 1, a material of the first material layer 141 is the same as a material of the plane segment, and the first material layer 141 is respectively connected to the plane segment and the bending portion 13; a material of the second material layer 142 is the same as a material of the bending portion 13, and the second material layer 142 is respectively connected to the plane segment and the bending portion 13. Therefore, by providing the transition segment 14, it is beneficial to improve the connection strength between the plane segment and the bending portion 13.

Figure 10:
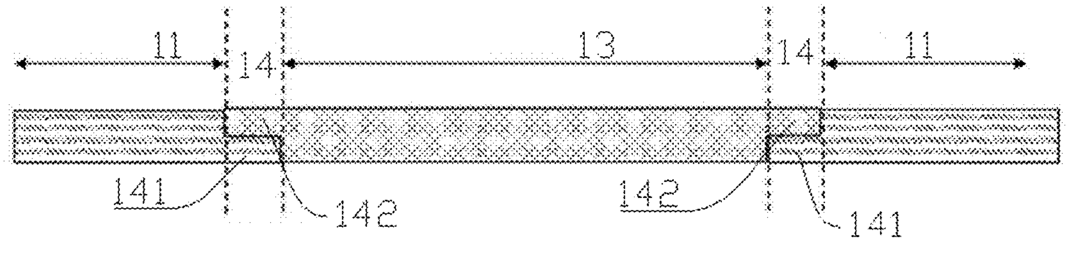
FIG. 10 is a schematic cross-sectional view of the support plate shown in FIG. 9.
Figure 11:
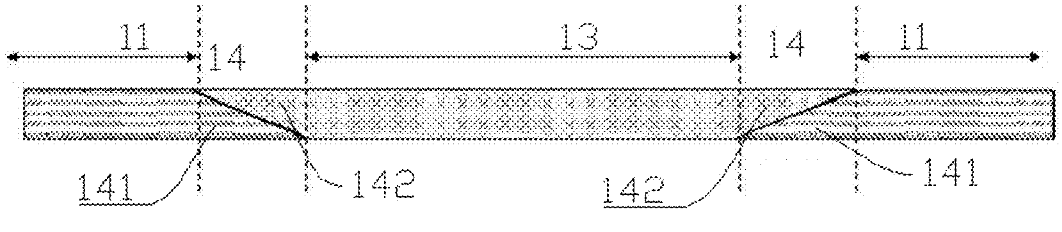
FIG. 11 is a schematic cross-sectional view of a support plate according to still another embodiment of the present disclosure.

Optionally, referring to FIG. 10, a thickness of the first material layer 141 is uniform, a thickness of the second material layer 142 is uniform, and a thickness of the transition segment 14, a thickness of the plane segment, and a thickness of the bending portion 13 are equal. Therefore, the structure is simple, and it is convenient for processing and manufacturing.

Certainly, the present disclosure is not limited to this. In other alternative embodiments, refer to FIG. 11, a thickness of the transition segment 14, a thickness of the plane segment, and a thickness of the bending portion 13 are equal; in a direction from the plane segment to the bending portion 13, a thickness of the first material layer 141 gradually decreases and a thickness of the second material layer 142 gradually increases. Thereby, it is helpful to increase the structural strength of the transition section 14, thereby improving the connection strength between the plane segment and the bending portion 13.

Specifically, the first material layer 141 and the plane segment are integrated into one body, and the second material layer 142 and the bending portion 13 are integrated into one body. That is, the first material layer 141 connected to the first plane segment 11 and the first plane segment 11 are integrated into one body, and the first material layer 141 connected to the second plane segment 12 and the second plane segment 12 are integrated into one body. The second material layer 142 on both sides of the bending portion 13 and the bending portion 13 are integrated into one body. Therefore, the connection strength is high and the reliability is better.

In some embodiments of the present disclosure, the flat plate comprises a first plane segment 11, a bending portion 13 and a second plane segment 12, that is to say, the first plane segment 11 and the second plane segment 12 are respectively connected to two ends of the bending portion 13, the bending portion 13 comprises a plurality of first connection segments 132 and a plurality of second connection segments 133. The plurality of first connection segments 132 are connected between the first plane segment 11 and the second plane segment 12, and the plurality of second connection segments 133 are connected (direct connection or indirect connection) between the first plane segment 11 and the second plane segment 12, in a direction perpendicular to a direction from the first plane segment 11 to the second plane segment 12, the plurality of first connection segments 132 and the plurality of second connection segments 133 are alternately disposed and connected to each other; wherein the first plane segment 11, the second plane segment 12 and the first connection segment 132 are integral parts of the same material, and a material of the second connection segment 133 is different from a material of the first plane segment 11.

Figure 12:
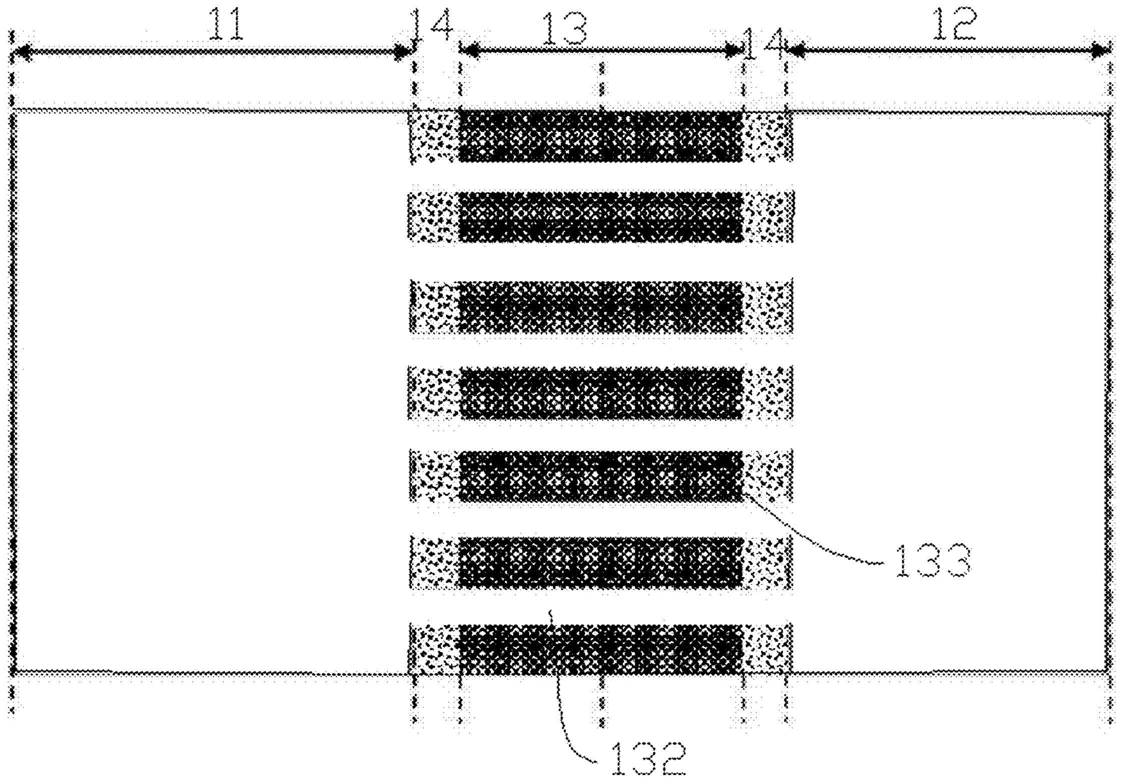
FIG. 12 is a schematic diagram of a support plate according to other embodiments of the present disclosure.

For example, referring to FIG. 12, the first plane segment 11 and the second plane segment 12 are spaced apart in the left-right direction. In the top-to-bottom direction, the first connection segment 132 and the second connection segment 133 are alternately disposed and are mutually adjacent. And the left and right ends of the first connection segment 132 are directly connected to the first plane segment 11 and the second plane segment 12, respectively, and the first connection segment 132 is integrally formed with the first plane segment 11 and the second plane segment 12. And the material is the same. The second connection segment 133 is connected between the first plane segment 11 and the second plane segment 12 and the material of the second connection segment 133 is different from that of the first plane segment 11.

Therefore, by providing the first connection segment 132, and the first connection segment 132, the first plane segment 11 and the second plane segment 12 are integrated into one body of the same material, it is beneficial to improve the first plane segment 11 and the second plane segment 12. The strength of the connection between them guarantees the reliability of the connection.

By setting the second connection segment 133 and making the material of the second connection segment 133 and the first plane segment 11 different (that is, the material of the second connection segment 133 is different from that of the first connection segment 132), it is beneficial to select materials with different strength and hardness to manufacture the first connection segment 132 and the second connection segment 133, respectively, thereby helping to optimize the bending ability and recovery ability of the bending portion 13, so that the bending portion 13 also has good bending ability and resilience.

Optionally, the strength and hardness of the first connection segment 132 are smaller than that of the second connection segment 133. As a result, the overall strength of the bending portion 13 can be made higher than that of the plane segment, thereby ensuring the reliability of the operation of the bending portion 13.

Optionally, a width of the first connection segment 132 is different from a width of the second connection segment 133. For example, the width of the first connection segment 132 is smaller than the width of the second connection segment 133, or the width of the first connection segment 132 is greater than the width of the second connection segment 133. Therefore, the bending ability and the resilience ability of the bending portion 13 can be optimized according to the design needs to meet the actual needs, and the matching of the bending and rebound forces can be achieved through the ratio of different widths. Certainly, for the convenience of processing, the width of the first connection segment 132 and the width of the second connection segment 133 may be the same.

According to some embodiments of the present disclosure, the first plane segment 11 and the second plane segment 12 form a plane segment; two ends of the second connection segment 133 are connected to the plane segment by a transition segment 14, the transition segment 14 comprises a first material layer 141 and a second material layer 142 laminated along the thickness direction of the support plate 1, a material of the first material layer 141 is the same as a material of the plane segment, and the first material layer 141 is respectively connected to the plane segment and the second connection segment 142; a material of the second material layer 142 is the same as a material of the second connection segment 133, and the second material layer 142 is respectively connected to the plane segment and the second connection segment 133. The length of the first connection segment 132 is the sum of the length of the second connection segment 133 and the length of the transition segment 14. Therefore, by providing the transition segment 14, it is beneficial to improve the connection strength between the plane segment and the second connection segment 133.

Optionally, the thickness of the first material layer 141 is uniform, the thickness of the second material layer 142 is uniform, and the thickness of the transition segment 14, the thickness of the plane segment, and the thickness of the second connecting segment 133 are all equal. Therefore, the structure is simple, and it is convenient for processing and manufacturing. Certainly, the present disclosure is not limited to this. In other alternative embodiments, the thickness of the transition segment 14, the thickness of the plane segment, and the thickness of the second connecting segment 133 are all the same, in the direction from the segment to the bending portion 13. The thickness of the first material layer 141 gradually decreased and the thickness of the second material layer 142 gradually increased, thereby helping to improve the structural strength of the transition segment 14, and thereby increasing the connection strength between the plane segment and the second connection segment 133.

Specifically, the first material layer 141 and the plane segment are integrated into one body, and the second material layer 142 and the second connection segment 133 are integrated into one body. That is, the first material layer 141 connected to the first plane segment 11 and the first plane segment 11 are integrated into one body, and the first material layer 141 connected to the second plane segment 12 and the second plane segment 12 are integrated into one body. The second material layer 142 on both sides of the second connection segment 133 and the second connection segment 133 are integrated into one body. Therefore, the connection strength is high and the reliability is better.

Optionally, the deformation hole 131 may be formed only on the first connection segment 132, or the deformation hole 131 may be formed only on the second connection segment 133, or the first connection segment 132 and the second connection segment 133 may be formed respectively deformation hole 131, which can be processed according to design needs to meet actual needs.

Figure 13:
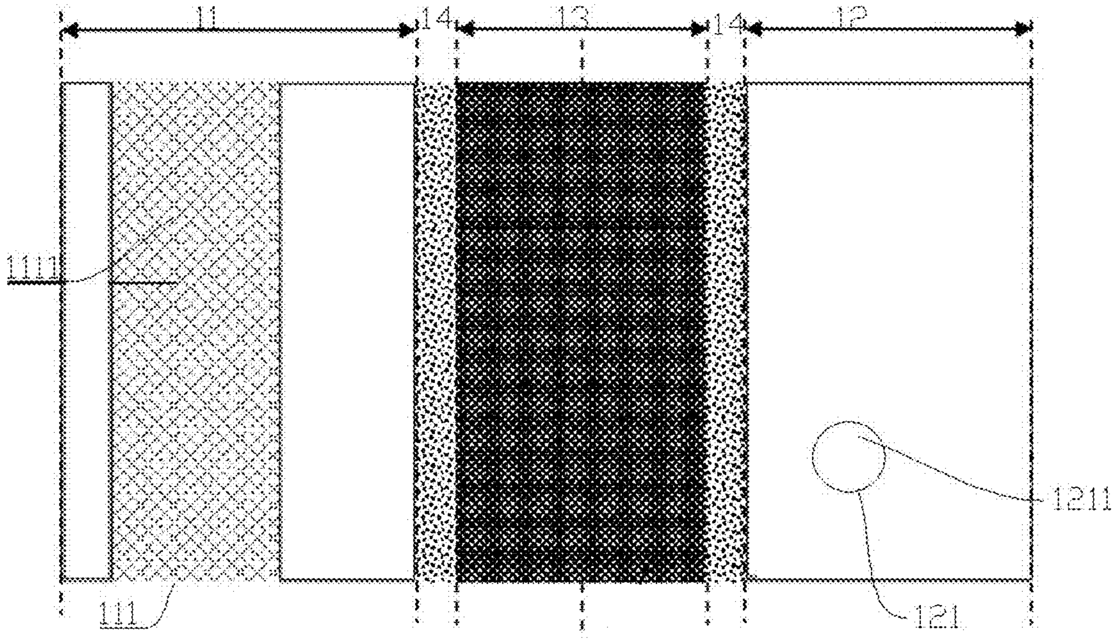
FIG. 13 is a schematic diagram of a support plate according to other embodiments of the present disclosure.

In some embodiments of the present disclosure, referring to FIG. 13, the first plane segment 11 is provided with a first mounting hole 111 extending in a thickness direction of the first plane segment 11, and a heat conducting metal component 1111 is provided in the first mounting hole 111 for blocking the first mounting hole 111.

The heat conductivity coefficient of heat conducting metal component 1111 is higher than the heat conductivity coefficient of the first plane segment 11. For the flexible display screen 100, the flexible display screen 100 is generally provided with a circuit board and a battery on the back, and a heating device such as a chip is on the circuit board. The heat conducting metal component 1111 can be in contact with a heat-generating component with a high heat generation to meet the heat dissipation requirements, and it is convenient to dissipate heat in the heat-generating component, the battery and the equipment.

Optionally, the heat conducting metal component 1111 is made of copper or aluminum. Therefore, the cost is low.

Optionally, referring to FIG. 13, the second plane segment 12 is provided with a second mounting hole 121, a ground metal component 1211 is provided in the second mounting hole 121 for blocking the second mounting hole 121, the ground metal component 1211 is configured as a ground point. By providing the ground metal component 1211, it is convenient for the circuit board to be connected to ground.

Alternatively, in other embodiments, the ground metal component 1211 may be set on the second plane segment 12 by coating process or the ground metal component 1211 can be processed on the second plane segment 12 by rolling process, and the second mounting hole 121 is no longer provided, thereby facilitating processing and manufacturing.

Optionally, the material of the ground metal component 1211 is different from that of the first plane segment 11, and the material of the ground metal component 1211 is nickel or silver to improve local conduction and reduce contact resistance to meet grounding needs.

Figure 14:
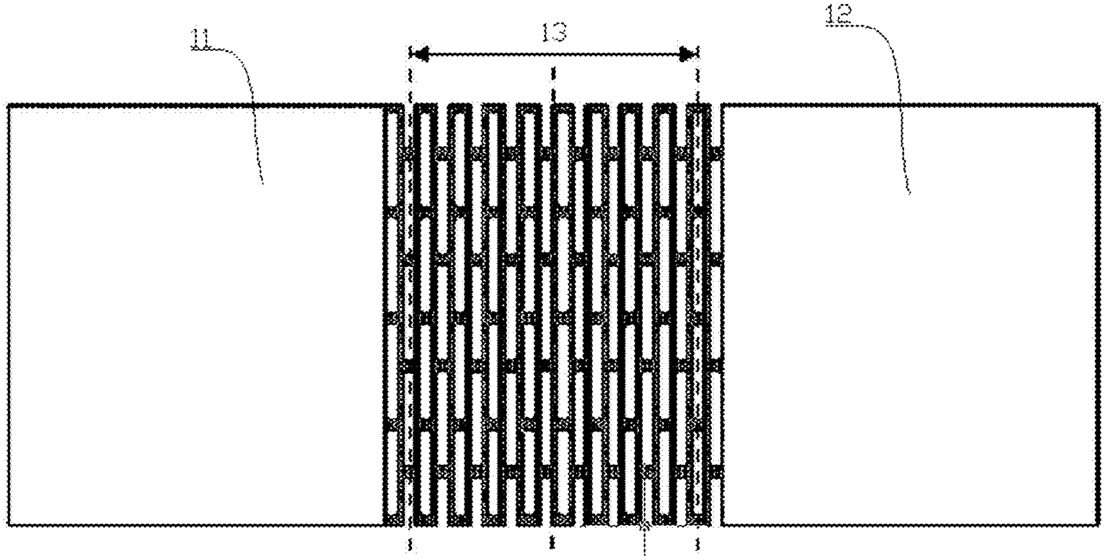
FIG. 14 is a schematic diagram of a support plate according to other embodiments of the present disclosure.
Figure 15:
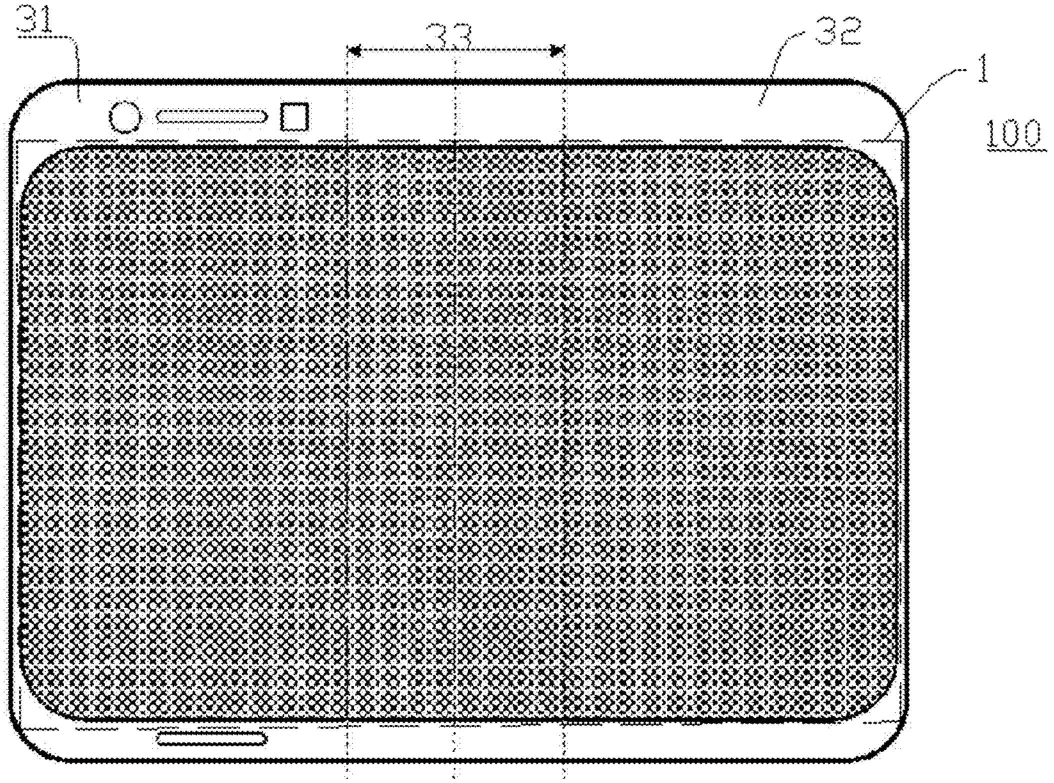
FIG. 15 is a schematic diagram of a flexible display screen according to some embodiments of the present disclosure, where a dashed line 1 indicates a projection of a support plate on a display screen body.

In some embodiments of the present disclosure, as shown in FIGS. 4 and 14, the deformation holes 131 may be multiple, and the plurality of deformation holes 131 are divided into a first deformation hole group and a second deformation hole group, and the first deformation hole group and the second deformation hole group respectively comprise a plurality of deformation holes 131. The first deformation hole group and the second deformation hole group are alternately arranged, and the plurality of deformation holes 131 of the first deformation hole group and the plurality of deformation holes 131 of the second deformation holes group are spaced apart in a direction perpendicular to the direction in which they are alternately arranged. Therefore, it is beneficial to further improve the bending ability of the bending portion 13.

Alternatively, each deformation hole 131 is oblong or rectangle, thus resulting in a simple structure.

In some embodiments of the present disclosure, the display screen body 3 is curved at a bendable position, that is, the display screen body is a curved screen. Therefore, at the bendable position, the support plate 1 and the display screen body 3 have the same curved state.

Figure 2:
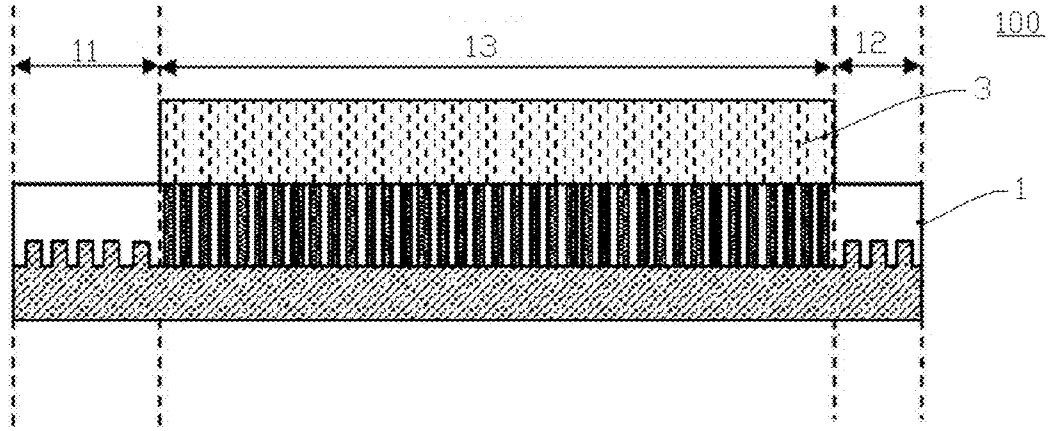
FIG. 2 is a schematic cross-sectional view of a flexible display screen according to some embodiments of the present disclosure.
Figure 3:
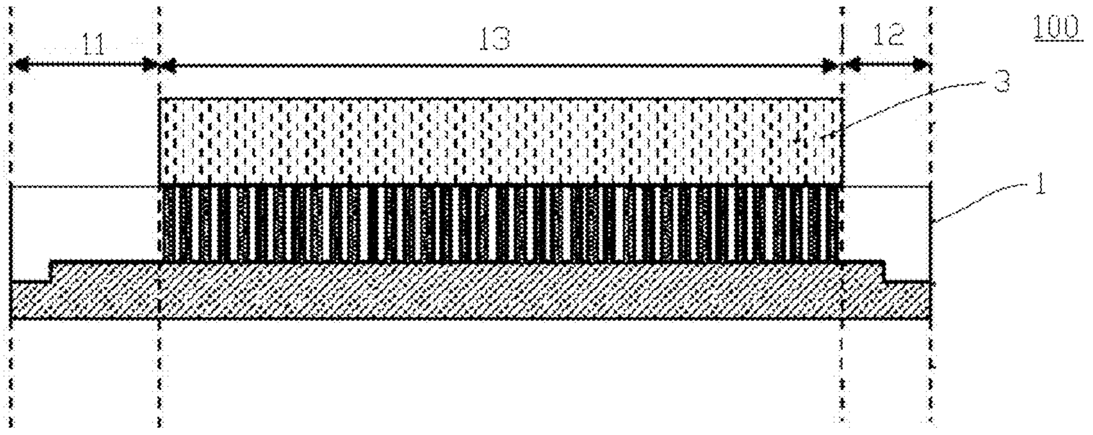
FIG. 3 is a schematic cross-sectional view of a flexible display screen according to some embodiments of the present disclosure.

As shown in FIGS. 1 to 3, the supporting plate 1 further comprises a first plane segment 11 and a second plane segment 12 connected to the bending portion 13. The first plane segment 11 and the second plane segment 12 are respectively connected to the two ends of the bending portion 13. The ends (for example, the left and right ends shown in FIGS. 1 to 3) are connected, and the length of the bending portion 13 is equal to the length of the display screen body 3 in the direction from the first plane segment 11 to the second plane segment 12. The first plane segment 11 and the second plane segment 12 are located on both sides of the display screen body 3 (for example, the first plane segment 11 is located on the left side of the display screen body 3 and is connected to the left end of the bending portion 13, and the second plane segment 12 is located on the right side of the display screen body 3 and connected to the right end of the bending portion 13). Therefore, the first plane segment 11 can be connected to the stretching mechanism, and the second plane segment 12 is connected to the rotating shaft. In this way, the flexible display screen 100 can be wound on the rotating shaft. When the flexible display 100 needs to be used, by triggering the stretching mechanism, the stretching mechanism pulls the first plane segment 11 and the rotating shaft rotates so that the bending portion 13 is expanded to pull the flexible display screen 100 to a flat position.

In the related art, the flexible panel is in a bendable position in the shell, that is, a static curved state, and is pulled out in a flat position. Since the flexible display screen 100 is thin and has a strong curling inertia when unfolded, the overall flatness of the flexible display screen 100 is poor, affecting product appearance and user experience. In the related art, the curved flexible display screen 100 uses a cover plate 34 to fix the module. The cover plate 34 is a flexible structure. If the tensile force is applied for a long time, there is a risk of deformation, the fixing ability is poor, and the rolled product has a certain sagging.

Therefore, in the embodiment of the present disclosure, by providing the support plate 1 on the non-display surface of the display screen body 3, the first plane segment 11 and the second plane segment are provided at the same time. The first plane segment 11 and the second plane segment 12 are located on both sides of the display screen body 3, thereby providing an assembly area for the assembly and fixing of the flexible display screen 100. It is not necessary to use a cover plate to connect with the above-mentioned rotating shaft and pulling mechanism, which is beneficial to improving the service life of the cover plate. And the support plate 1 can withstand a certain pulling force, which is beneficial to the support plate 1 unfolded into a flat shape to support the display screen body 3 in a flat position, which can effectively avoid the problem of the display screen body 3 curling due to the curling inertia in the flat position. The flatness of the flexible display screen 100 is improved, and sagging of the flexible display screen 100 is avoided.

Optionally, the support plate 1 may be a stainless steel component or the like. Certainly, it can be understood that the support plate 1 is not limited to the hard material of stainless steel, and may also be other rigid supporting materials.

Optionally, the first plane segment 11 and the rotating shaft may be connected by screws. For example, a screw hole is provided on the first plane segment 11, and a screw post is provided on the rotating shaft. The screw is mounted on the screw post through the screw hole to connect the first plane segment 11 and the rotating shaft. Certainly, it can be understood that a screw post may be provided on the first plane segment 11 and a screw hole may be provided on the rotating shaft, as long as the screw connection between the first plane segment 11 and the rotating shaft can be ensured. Therefore, the connection method is simple and easy to install.

Optionally, the first plane segment 11 and the rotating shaft may also be connected by welding. Therefore, the processing technology is simple, which is beneficial to reducing costs.

In some examples of the present disclosure, the second plane segment 12 and the stretching mechanism may be connected by screws. For example, a screw hole is provided on the second plane segment 12, a screw post is provided on the stretching mechanism, and a screw is mounted on the screw post through the screw hole to connect the second plane segment 12 and the stretching mechanism. Certainly, it can be understood that a screw post can also be provided on the second plane segment 12 and a screw hole can be provided on the stretching mechanism, as long as the screw connection between the second plane segment 12 and the stretching mechanism can be ensured. Therefore, the connection method is simple and easy to install.

Optionally, the second plane segment 12 and the stretching mechanism may also be connected by welding. Therefore, the processing technology is simple, which is beneficial to reducing costs.

In some embodiments of the present disclosure, the display screen body 3 comprises a first straight segment 31, a first bent segment 33, and a second straight segment 32 that are sequentially connected, the first straight segment 31 and the second straight segment 32 are stacked in the bendable position, and the first bent segment is bent; the flat plate further comprises a first plane segment, a bending portion 13 and a second plane segment 12, wherein the first plane segment 11 is directly opposed to the first straight segment 31, the bending portion 13 is directly opposed to the first bent segment 33, and the second plane segment 12 is directly opposed to the second straight segment 32. Therefore, the flexible display screen 100 is a folding screen, and the bending portion 13 can be used to support the first bent segment 33, disperse stress concentration and rebound. Using the first plane segment 11 to support the first straight segment 31 and using the second plane segment 12 to support the second straight segment 32 to improve the crush resistance of the flat area.

The following describes an electronic device according to an embodiment of the present disclosure. An electronic device according to an embodiment of the present disclosure includes the flexible display screen 100 described above.

According to the electronic device according to the embodiment of the present disclosure, by providing the flexible display screen 100 described above, the flatness of the electronic device is good and the appearance is beautiful when in a flat position.

Unless otherwise defined, the technical or scientific terms used in the present disclosure shall have the ordinary meanings understood by those of ordinary skill in the art to which the present disclosure belongs. The terms "first", "second", and the like used in this disclosure do not indicate any order, quantity, or priority, but are only used to distinguish different components. Expressions such as "connection" or "connected" are not limited to denote physical or mechanical connections, but may include electrical connections, whether direct or indirect. "Up", "down", "left", "right", etc. are only used to indicate the relative position relationship. When the absolute position of the described object changes, the relative position relationship changes accordingly.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A flexible display screen, comprising:

a display screen body having a flat position and a bendable position; and a support plate disposed on a non-display surface of the display screen body, wherein the support plate comprises a flat plate and a bending portion, wherein the flat plate is located at the flat position and configured to support the display screen body, wherein the bending portion is located at the bendable position and bent to fit the bendable position of the display screen body, and comprises a plurality of deformation holes spaced from each other, wherein the flat plate further comprises: a first plane segment and a second plane segment, and the first plane segment and the second plane segment are respectively connected to two ends of the bending portion, and the material of the bending portion is different from that of the first plane segment and the second plane segment, wherein each of the bending portion, the first plane segment, and the second plane segment has a single-layer structure, wherein a material of the first plane segment is the same as that of the second plane segment, and the first plane segment and the second plane segment form a plane segment, and wherein the plane segment is connected to the bending portion through a transition segment, the transition segment comprises a first material layer and a second material layer laminated along the thickness direction of the support plate, a material of the first material layer is the same as that of the plane segment, and the first material layer is respectively connected to the plane segment and the bending portion; a material of the second material layer is the same as that of the bending portion, and the second material layer is respectively connected to the plane segment and the bending portion.

2. The flexible display screen according to claim 1, wherein the support plate further comprises:

a support metal layer disposed on the non-display surface of the display screen body; and a heat dissipation metal layer disposed on a surface of the support metal layer away from the display screen body, wherein the materials of the heat dissipation metal layer and the support metal layer are different.

3. The flexible display screen according to claim 2, wherein a heat conductivity coefficient of the heat dissipation metal layer is higher than a heat conductivity coefficient of the support metal layer, a strength of the support metal layer is not less than a strength of the heat dissipation metal layer, a hardness of the support metal layer is not less than a hardness of the heat dissipation metal layer.

4. The flexible display screen according to claim 2, wherein each of the deformation holes is located on the heat dissipation metal layer, and is filled with polymer heat conducting component.

5. The flexible display screen according to claim 2, wherein the support metal layer and the heat dissipation metal layer are integrated parts.

6. The flexible display screen according to claim 2, wherein the support metal layer and the heat dissipation metal layer are integrated through a rolling process or a coating process.

7. The flexible display screen according to claim 2, wherein a thickness of the support metal layer ranges from 0.015 to 0.5 mm; and/or a thickness of the heat dissipation metal layer ranges from 0.04 to 0.5 mm.

8. The flexible display screen according to claim 1, wherein a heat-insulating layer is provided between the support plate and the display screen body.

9. The flexible display screen according to claim 8, wherein the heat-insulating layer is made of rubber or silicone.

10. The flexible display screen according to claim 8, wherein each of the deformation holes penetrates the support plate along a thickness direction of the support plate;

the flexible display screen further comprises a heat insulation filling layer connected to the heat-insulating layer, and each of the deformation holes is provided with the heat insulation filling layer.

11. The flexible display screen according to claim 1, wherein a strength of the bending portion is not less than a strength of the first plane segment;

a hardness of the bending portion is not less than a hardness of the first plane segment;

a strength of the bending portion is not less than a strength of the second plane segment; and a hardness of the bending portion is not less than a hardness of the second plane segment.

12. The flexible display screen according to claim 1, wherein a thickness of the first material layer is uniform, a thickness of the second material layer is uniform, and a thickness of the transition segment, a thickness of the plane segment, and a thickness of the bending portion are equal.

13. The flexible display screen according to claim 1, wherein a thickness of the transition segment, a thickness of the plane segment, and a thickness of the bending portion are equal;

in a direction from the plane segment to the bending portion, a thickness of the first material layer decreases gradually and a thickness of the second material layer increases gradually.

14. The flexible display screen according to claim 1, wherein the flat plate further comprises:

a first plane segment and a second plane segment, and the first plane segment and the second plane segment are respectively connected to two ends of the bending portion, the bending portion comprises a plurality of first connection segments and a plurality of second connection segments, the plurality of first connection segments are connected between the first plane segment and the second plane segment, and the plurality of second connection segments are connected between the first plane segment and the second plane segment, in a direction perpendicular to a direction from the first plane segment to the second plane segment, the plurality of first connection segments and the plurality of second connection segments are alternately disposed and connected to each other;

wherein the first plane segment, the second plane segment and the first connection segment are integrally formed with the same material, and a material of the second connection segment is different from that of the first plane segment.

15. The flexible display screen according to claim 14, wherein the first plane segment and the second plane segment form a plane segment;

two ends of the second connection segment are connected to the plane segment by a transition segment, the transition segment comprises a first material layer and a second material layer laminated along the thickness direction of the support plate, a material of the first material layer is the same as that of the plane segment, and the first material layer is connected to the plane segment and the second connection segment respectively; a material of the second material layer is the same as that of the second connection segment, and the second material layer is connected to the plane segment and the second connection segment respectively.

16. The flexible display screen according to claim 14, wherein a width of the first connection segment is different from a width of the second connection segment.

17. An electronic device, comprising the flexible display screen according to claim 1.

18. A flexible display screen, comprising:

a display screen body having a flat position and a bendable position; and a support plate disposed on a non-display surface of the display screen body, wherein the support plate comprises a flat plate and a bending portion, wherein the flat plate is located at the flat position and configured to support the display screen body, wherein the bending portion is located at the bendable position and bent to fit the bendable position of the display screen body, and comprises a plurality of deformation holes spaced from each other, wherein the flat plate further comprises a first plane segment and a second plane segment, and the first plane segment and the second plane segment are respectively connected to two ends of the bending portion, the bending portion comprises a plurality of first connection segments and a plurality of second connection segments, wherein the plurality of first connection segments are connected between the first plane segment and the second plane segment, and the plurality of second connection segments are connected between the first plane segment and the second plane segment, in a direction perpendicular to a direction from the first plane segment to the second plane segment, the plurality of first connection segments and the plurality of second connection segments are alternately disposed and connected to each other, wherein the first plane segment, the second plane segment and the first connection segment are integrally formed with the same material, and a material of the second connection segment is different from that of the first plane segment, wherein the first plane segment and the second plane segment form a plane segment, and wherein two ends of the second connection segment are connected to the plane segment by a transition segment, the transition segment comprises a first material layer and a second material layer laminated along the thickness direction of the support plate, a material of the first material layer is the same as that of the plane segment, and the first material layer is connected to the plane segment and the second connection segment respectively; a material of the second material layer is the same as that of the second connection segment, and the second material layer is connected to the plane segment and the second connection segment respectively.

* * * * *